(12) United States Patent
Jung et al.

(10) Patent No.: US 10,599,319 B2
(45) Date of Patent: Mar. 24, 2020

(54) DRAG AND DROP INSERTION CONTROL OBJECT

(71) Applicant: Microsoft Technology Licensing, LLC, Redmond, WA (US)

(72) Inventors: Christopher Andrews Jung, Mercer Island, WA (US); Erez Kikin Gil, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 204 days.

(21) Appl. No.: 15/457,757

(22) Filed: Mar. 13, 2017

(65) Prior Publication Data
US 2018/0260091 A1    Sep. 13, 2018

(51) Int. Cl.
| | |
|---|---|
| *G06F 3/0486* | (2013.01) |
| *G06F 3/0482* | (2013.01) |
| *G06F 3/0484* | (2013.01) |
| *G06F 3/0488* | (2013.01) |

(52) U.S. Cl.
CPC .......... *G06F 3/0486* (2013.01); *G06F 3/0482* (2013.01); *G06F 3/04842* (2013.01); *G06F 3/04883* (2013.01); *G06F 3/0488* (2013.01)

(58) Field of Classification Search
CPC .. G06F 3/0486; G06F 3/04842; G06F 3/0482; G06F 3/0488
See application file for complete search history.

(56) References Cited

U.S. PATENT DOCUMENTS

| | | | |
|---|---|---|---|
| 5,644,739 A | 7/1997 | Moursund | |
| 6,002,402 A | 12/1999 | Schacher | |
| 6,246,411 B1* | 6/2001 | Strauss | G06F 3/0486 |
| | | | 715/769 |
| 6,621,532 B1 | 9/2003 | Mandt | |

(Continued)

FOREIGN PATENT DOCUMENTS

EP    2113830 A2    11/2009

OTHER PUBLICATIONS

Screen captures from YouTube clip entitled "How to Drag and Drop New Data on a Chart in Microsoft Excel" 2 pages, uploaded Jun. 23, 2010 by Que Publishing. Retrieved from Internet: <https://www.youtube.com/watch?v=eTyBGbxzVK4> (Year: 2010).*

(Continued)

*Primary Examiner* — Abdullah Al Kawsar
*Assistant Examiner* — Kenny Nguyen
(74) *Attorney, Agent, or Firm* — Schwegman Lundberg & Woessner, P.A.

(57) ABSTRACT

Generally discussed herein are devices, systems, and methods for an insertion and/or modification control object. A method for using a user interface (UI) of a computing device may include selecting, using a user input device and releasing a control object using the UI, selecting a first object to insert below one or more items shown on the UI, wherein the first object is one of a first set of objects shown on the UI in response to releasing the control object, selecting and dragging the control object to a location between two of the items on the UI, releasing the control object at the location, and selecting a second object to insert at the location between the items, wherein the second object is one of the first set of objects shown on the UI in response to releasing the control object.

19 Claims, 12 Drawing Sheets

(56) References Cited

U.S. PATENT DOCUMENTS

| | | | |
|---|---|---|---|
| 6,677,965 B1 | 1/2004 | Ullmann et al. | |
| 7,818,672 B2 | 10/2010 | McCormack et al. | |
| 2009/0193351 A1* | 7/2009 | Lee | G06F 3/0482 715/769 |
| 2009/0259959 A1* | 10/2009 | Grotjohn | G06F 3/04817 715/769 |
| 2010/0122192 A1* | 5/2010 | Hanna | G06T 11/00 715/765 |
| 2011/0022985 A1 | 1/2011 | Ording et al. | |
| 2013/0019175 A1* | 1/2013 | Kotler | G06F 3/0482 715/728 |
| 2013/0019193 A1 | 1/2013 | Rhee et al. | |
| 2013/0254714 A1 | 9/2013 | Shin et al. | |
| 2016/0110056 A1 | 4/2016 | Hong et al. | |
| 2016/0117072 A1 | 4/2016 | Sharifi et al. | |
| 2016/0328123 A1* | 11/2016 | Toda | G06F 3/0482 |
| 2017/0168655 A1* | 6/2017 | Jann | G06F 3/0481 |
| 2017/0187868 A1* | 6/2017 | Katai | H04M 1/72583 |
| 2017/0221272 A1* | 8/2017 | Li | G06T 7/204 |
| 2017/0235706 A1* | 8/2017 | Esterly | G06F 3/0484 715/243 |

OTHER PUBLICATIONS

"International Search Report and Written Opinion Issued in PCT Application No. PCT/US2018/020997", dated Jul. 5, 2018, 10 Pages.

"How to create a floating action button (FAB) in android, using AppCompat v21?", https://web.archive.org/web/20141203022326/http:/stackoverflow.com/questions/26963219/how-to-create-a-floating-action-button-fab-in-android-using-appcompat-v21, Published on: Dec. 3, 2014, 7 pages.

Mejia, Levin, "How to Create a Sticky Add to Cart Button on Scroll", https://www.shopify.in/partners/blog/112052742-how-to-create-a-sticky-add-to-cart-button-on-scroll, Published on: May 27, 2016, 12 pages.

Johnson, Steve, "Creating a SharePoint Site", http://www.quepublishing.com/articles/article.aspx? p=2150665&seqNum=9, Published on: Jan. 22, 2014, 2 pages.

* cited by examiner

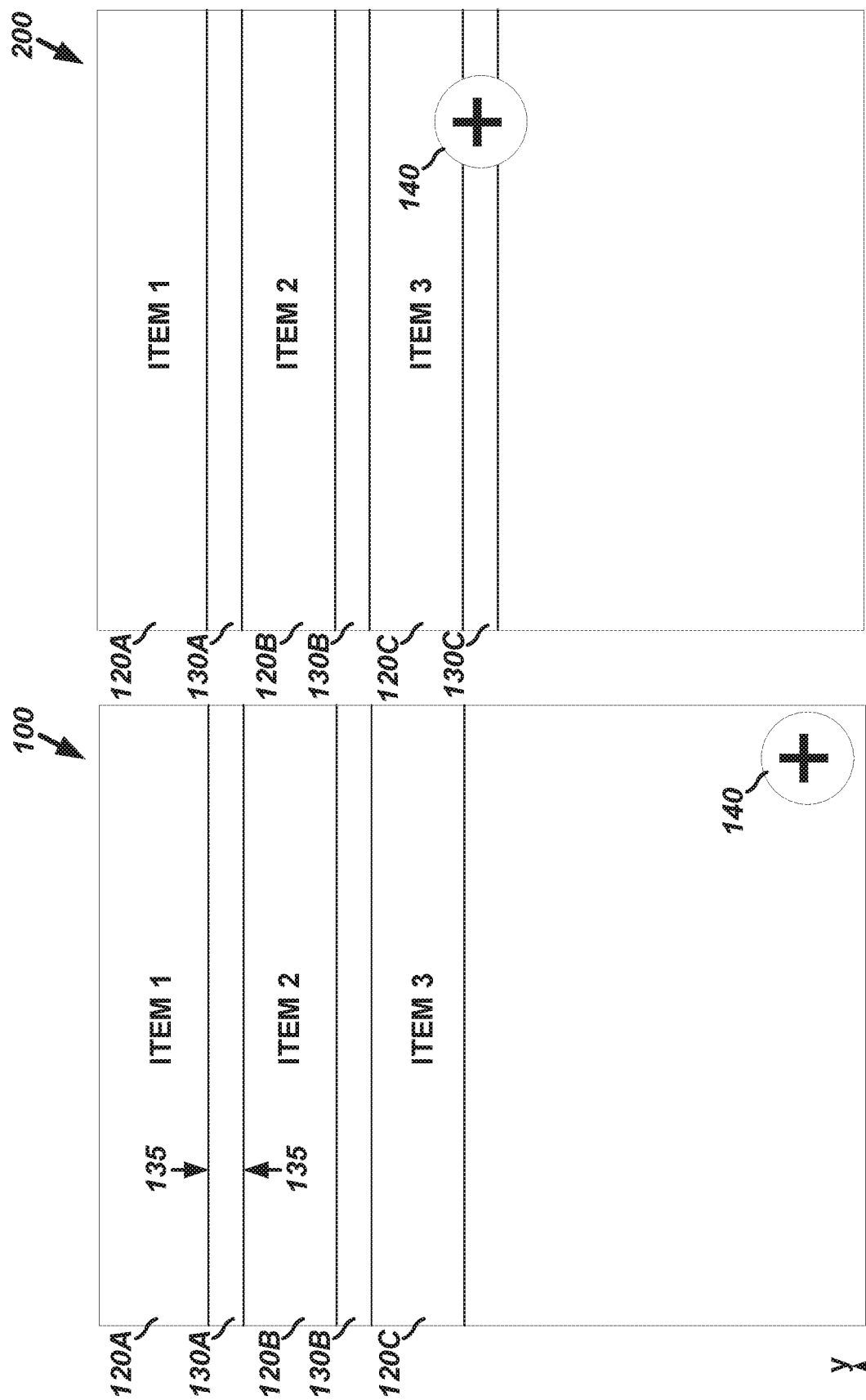

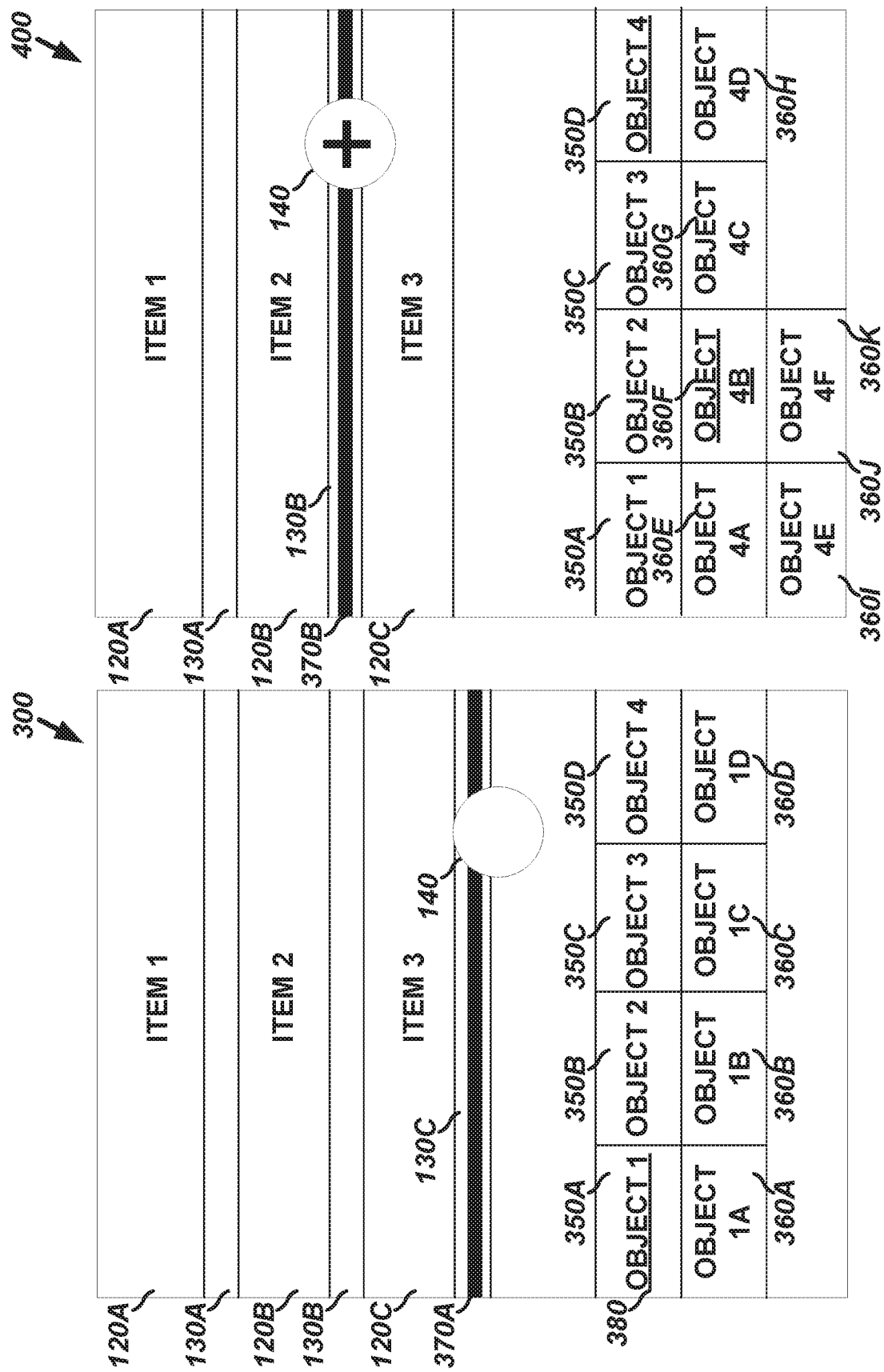

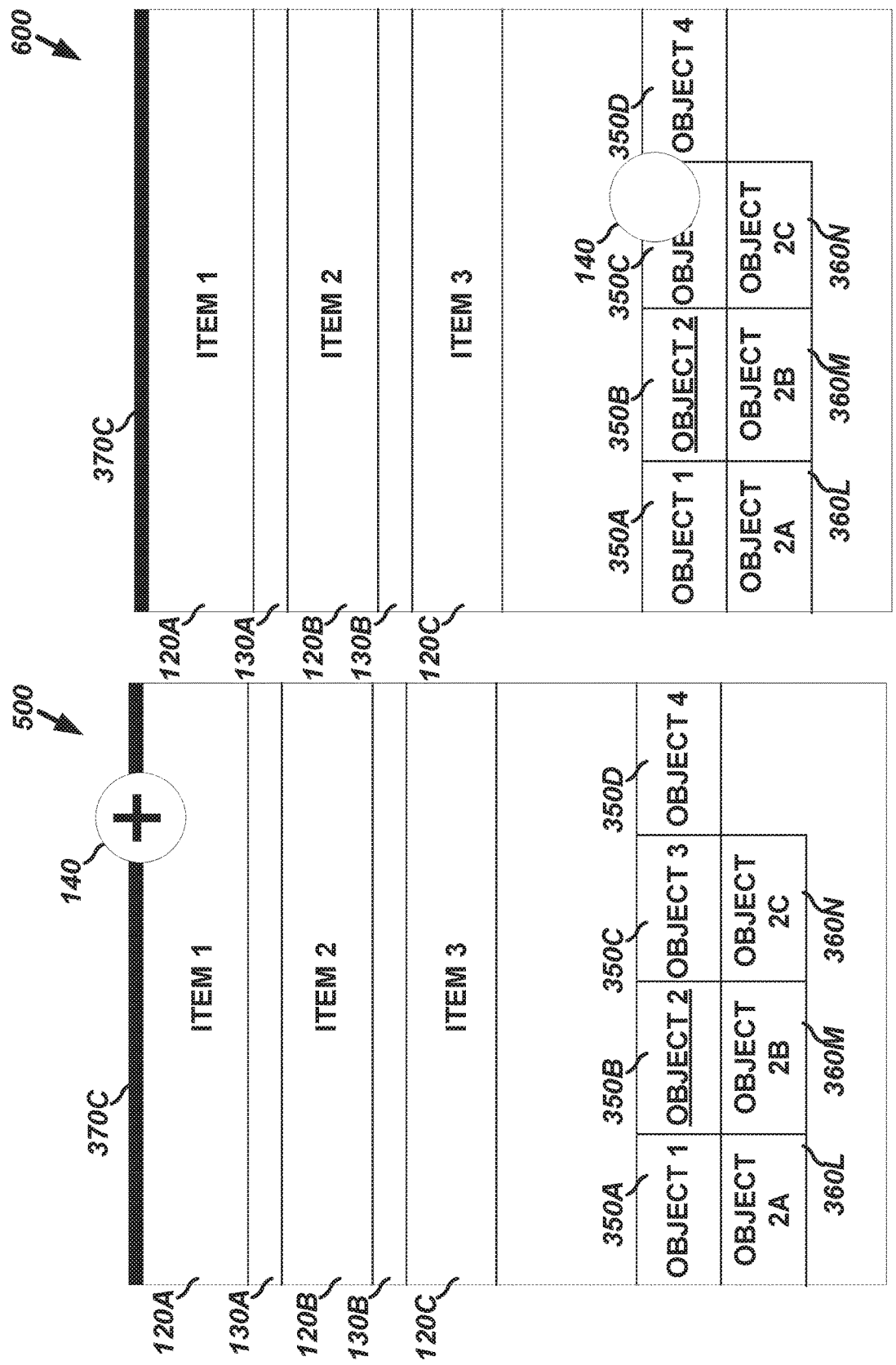

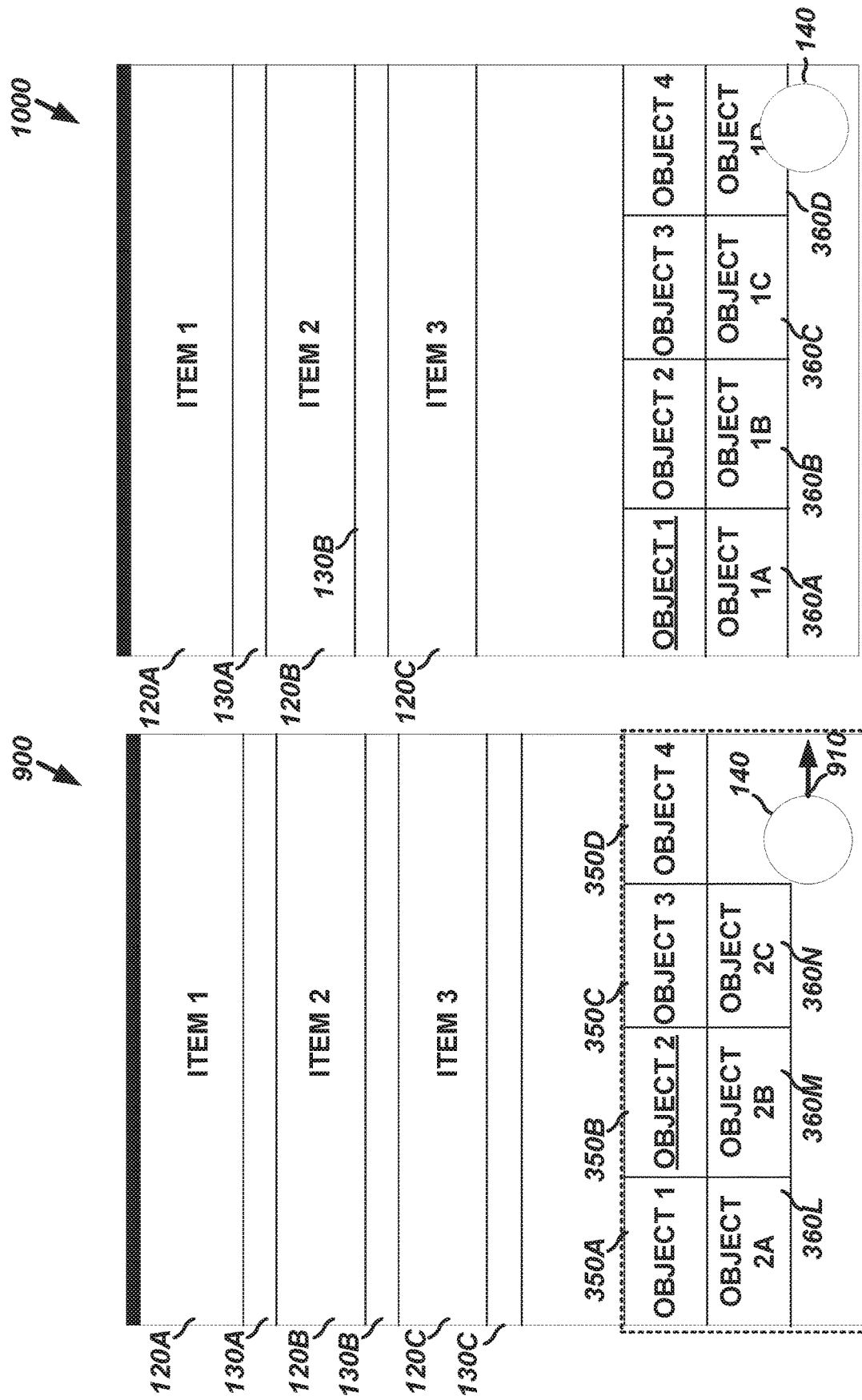

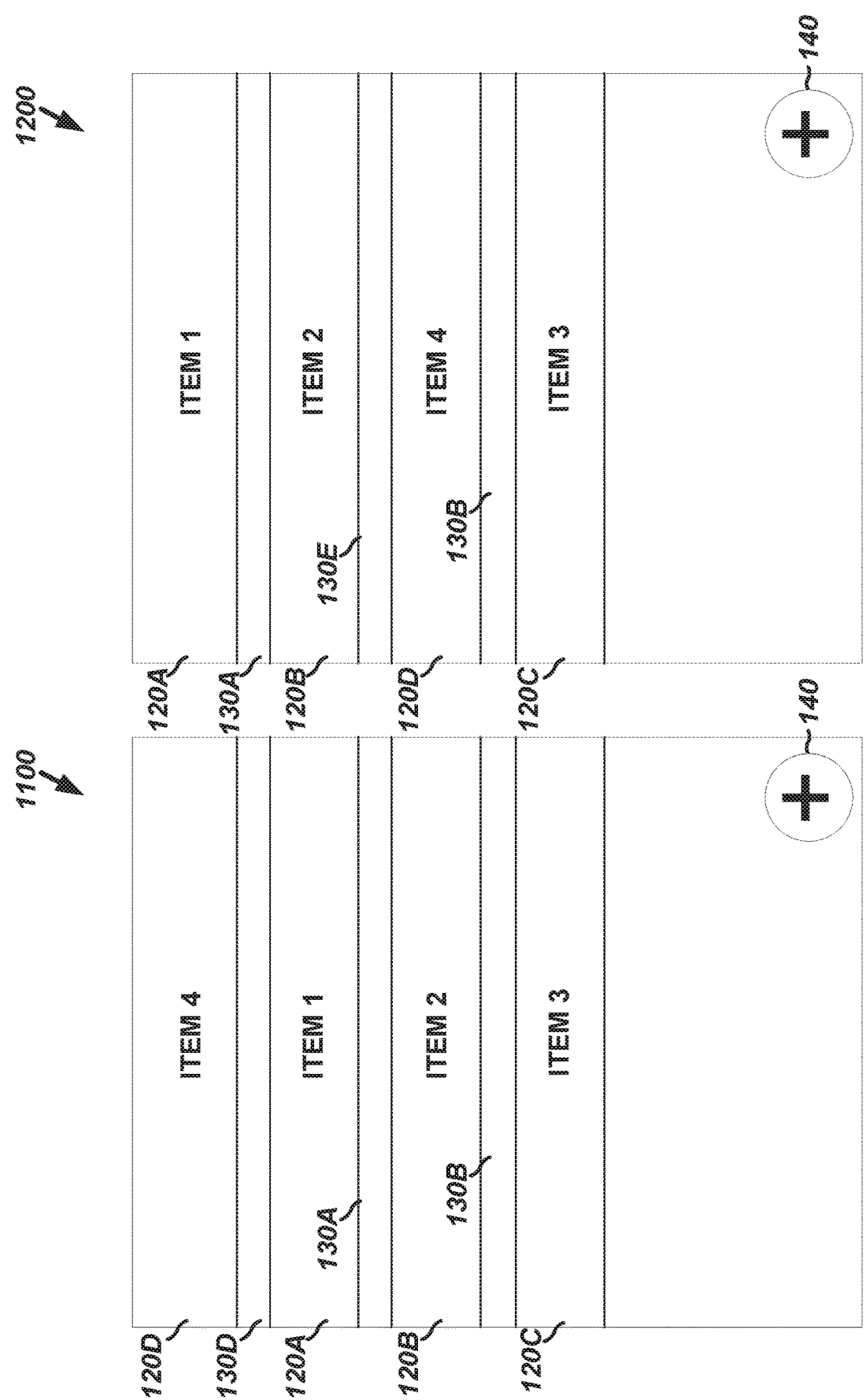

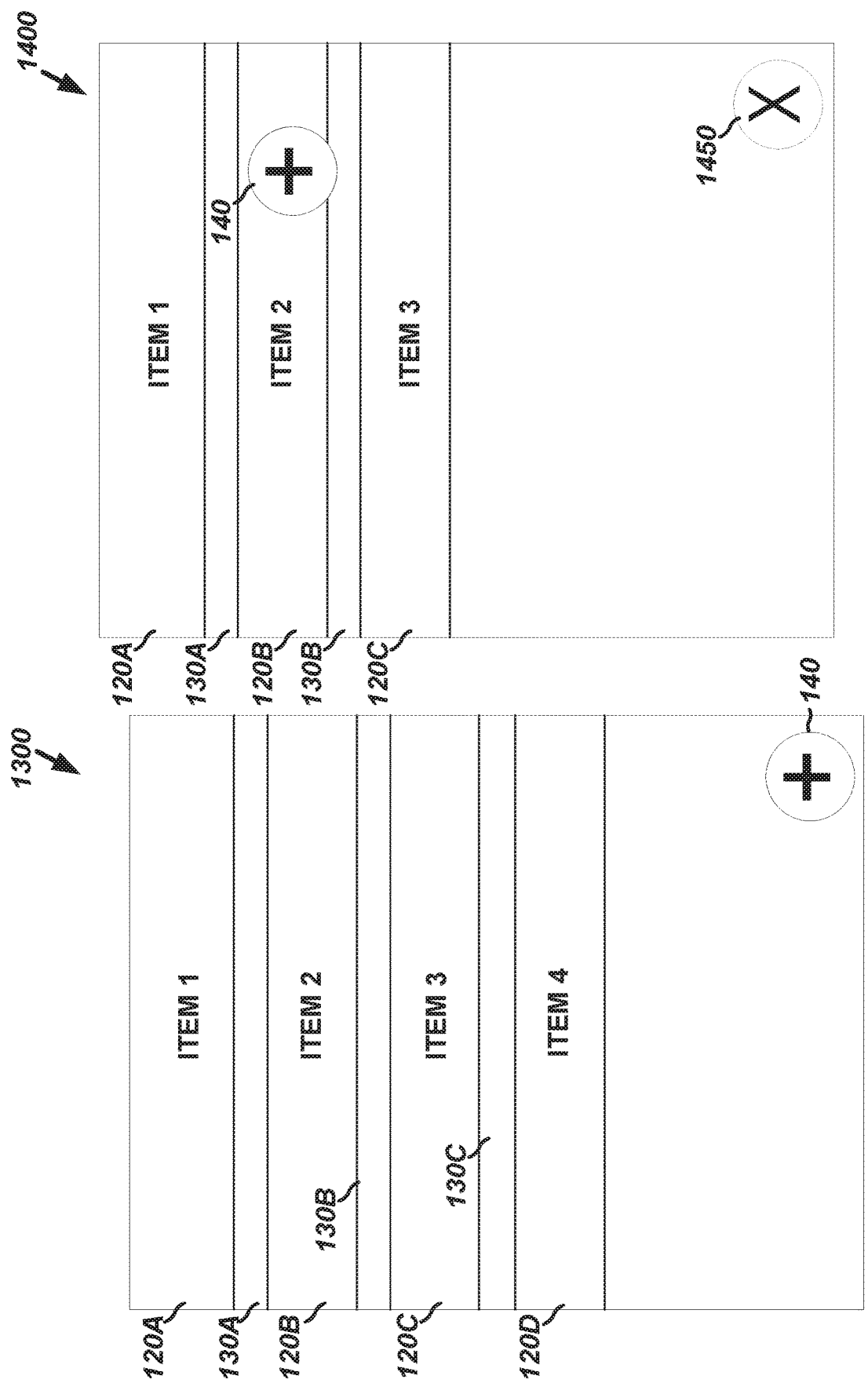

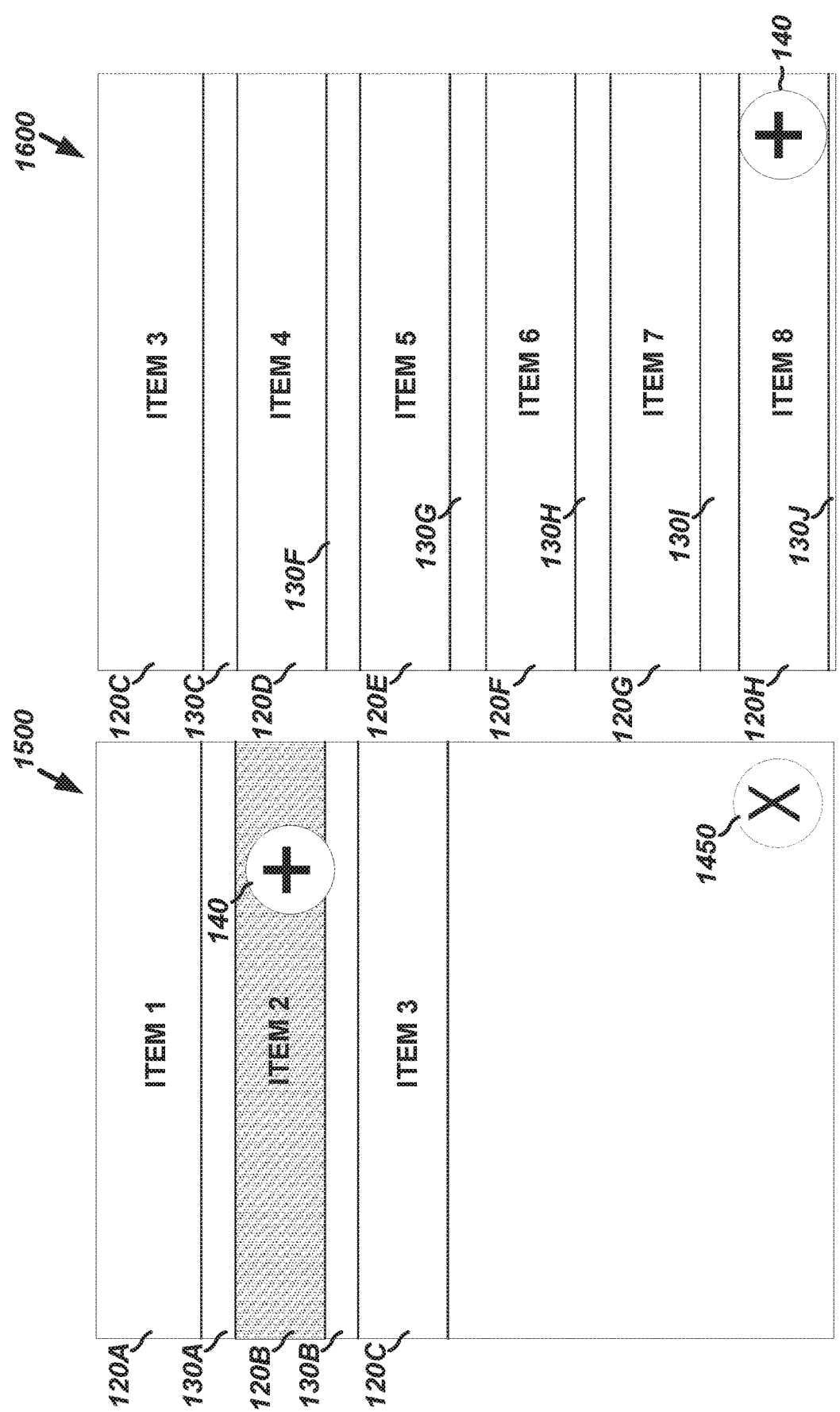

DRAG AND DROP INSERTION CONTROL OBJECT

BACKGROUND

When presented with a list or other group of objects, such as on a user interface (UI), it may be difficult to insert an object within or around the group. It may be even more difficult to insert the object in a predictable position on the UI, such as without clogging the interface with entry points around each of the objects. This may be especially troublesome with smaller screens, such as a touch screen of a mobile phone, tablet, or other screen.

SUMMARY

This summary section is provided to introduce aspects of embodiments in a simplified form, with further explanation of the embodiments following in the detailed description. This summary section is not intended to identify essential or required features of the claimed subject matter, and the particular combination and order of elements listed this summary section is not intended to provide limitation to the elements of the claimed subject matter.

A method for using a user interface (UI) of a computing device includes selecting, using a user input device and releasing a control object using the UI, selecting a first object to insert below one or more items shown on the UI, wherein the first object is one of a first set of objects shown on the UI in response to releasing the control object, selecting and dragging the control object to a location between two of the items on the UI, releasing the control object at the location, and selecting a second object to insert at the location between the items, wherein the second object is one of the first set of objects shown on the UI in response to releasing the control object.

At least one machine-readable storage medium includes instructions for execution by a machine to perform operations. The operations include in response to receiving, from a user input device, data indicating that an insert control object was dragged on a display device, determining whether the insert control object was dragged to a location between two items of one or more items on the display device, to a location above the one or more items on the display device, or to a location below the one or more items on the display device, providing signals to the display device that cause the display device to show a location indicator object that indicates a location at which an item, when inserted using the insert control object, will be displayed, in response to receiving data indicating that the insert control object was released, providing signals that cause the display device to show a list of objects for insertion at the location indicated by the location indicator object, and in response to receiving a selection of an object of the objects, providing signals that cause the display device to show the selected object at the location indicated by the location indicator object.

A system includes a display device, processing circuitry, a memory including instructions that, when executed by the processing circuitry, cause the processing circuitry to perform operations. The operations may include providing signals that cause the display device to show a control object on the display device, in response to receiving one or more signals, from a user input device, determining that a user has dragged the control object to within a threshold number of pixels of a gap between items shown on the display device and provide signals that cause the display device to show a location indicator at the gap, the location indicator indicating a location at which an item will be inserted if the user releases the control object at the location, in response to receiving one or more signals indicating that the user has released the control object at the location, providing signals that cause the display device to show a list of objects for insertion at the location indicated by the location indicator, and in response to receiving one or more signals indicating that the user has selected an object from the list of objects, providing signals that cause the display device to show the selected object as an item at the location indicated by the location indicator.

BRIEF DESCRIPTION OF THE DRAWINGS

FIG. 1 illustrates, by way of example, a perspective diagram of an embodiment of a user interface (UI) that includes an insertion/modification control object.

FIG. 2 illustrates, by way of example, a perspective view diagram of an embodiment of the UI.

FIG. 3 illustrates, by way of example, a perspective view diagram of an embodiment of the UI.

FIG. 4 illustrates, by way of example, a perspective view diagram of an embodiment of the UI.

FIG. 5 illustrates, by way of example, a perspective view diagram of an embodiment of the UI.

FIG. 6 illustrates, by way of example, a perspective view diagram of an embodiment of the UI.

FIG. 9 illustrates, by way of example, a perspective view diagram of an embodiment of the UI.

FIG. 10 illustrates, by way of example, a perspective view diagram of an embodiment of the UI.

FIG. 11 illustrates, by way of example, a perspective view diagram of an embodiment of the UI.

FIG. 12 illustrates, by way of example, a perspective view diagram of an embodiment of the UI.

FIG. 13 illustrates, by way of example, a perspective view diagram of an embodiment of the UI.

FIG. 14 illustrates, by way of example, a perspective view diagram of an embodiment of the UI.

FIG. 15 illustrates, by way of example, a perspective view diagram of an embodiment of the UI.

FIG. 16 illustrates, by way of example, a perspective view diagram of an embodiment of the UI.

DETAILED DESCRIPTION

Figures 7, 8:
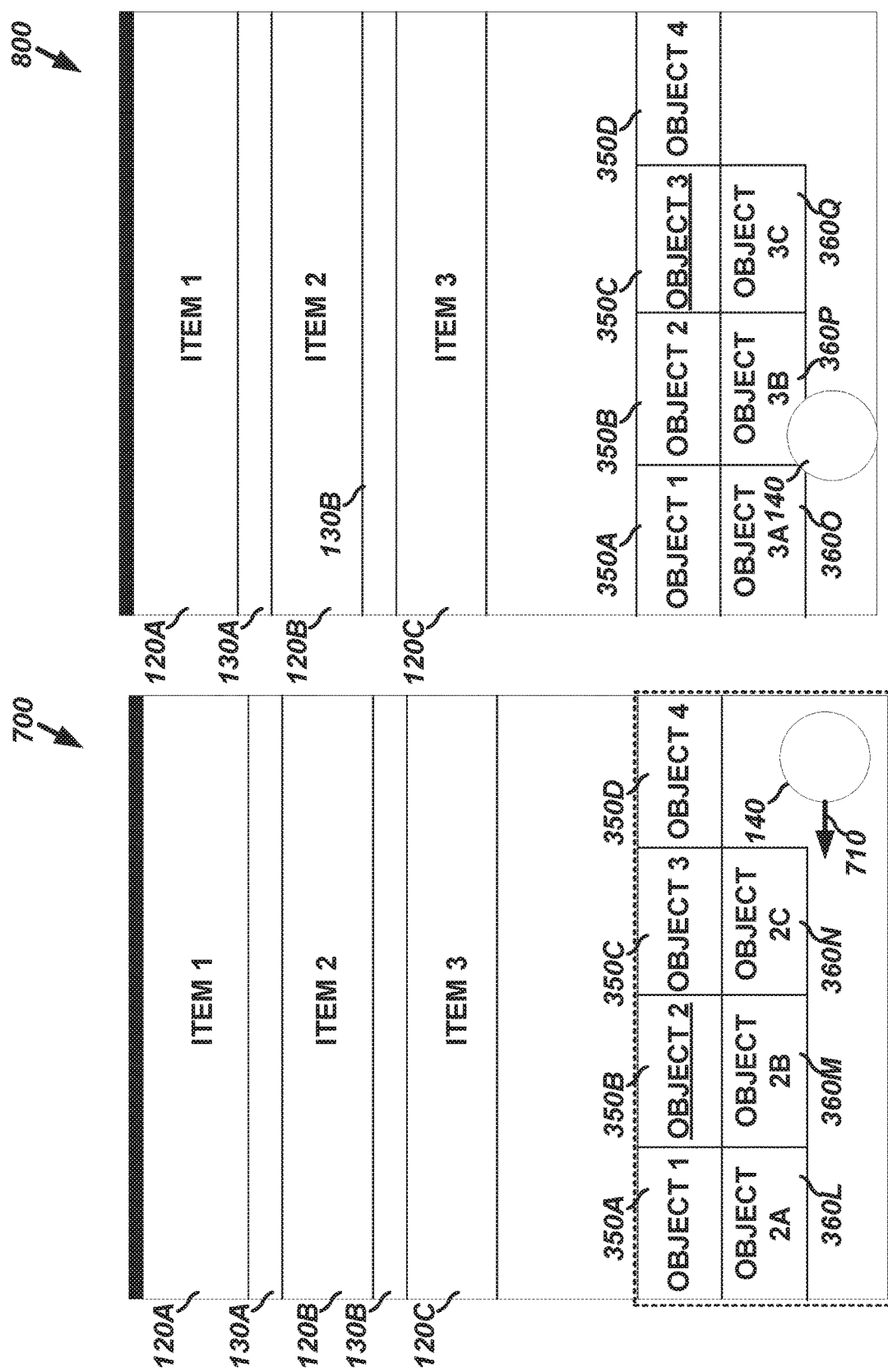
FIG. 7 illustrates, by way of example, a perspective view diagram of an embodiment of the UI.
FIG. 8 illustrates, by way of example, a perspective view diagram of an embodiment of the UI.

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

The operations, functions, or algorithms described herein may be implemented in software in some embodiments. The software may include computer executable instructions stored on computer or other machine readable media or storage device, such as one or more non-transitory memories or other type of hardware based storage devices, either local or networked. Further, such functions may correspond to subsystems, which may be software, hardware, firmware or a combination thereof. Multiple functions may be performed in one or more subsystems as desired, and the embodiments described are merely examples. The software may be executed on a digital signal processor, ASIC, microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, logic gates, or the like) configured to perform one or more operations.

In overcoming one or more issues with present graphical or other image object modification and/or insertion tools, a modification and/or insertion control object may be instantiated and visible for selection, relocation, and/or other use. The control object may more clearly indicate an object to be modified, modification options available for a given object, an insertion point for the object, and/or objects that may be inserted at a given location. The control object may be small in size, such as to not clutter a display through which a user is viewing and interacting with the user interface (UI).

Discussed herein are embodiments that may include a control object that may be actuated, dragged, dropped, and/or otherwise situated among objects of a UI. The control object may be actuated (e.g., tapped in the case of a touch screen, or selected with a cursor using a mouse, touchpad, trackpad, pen (e.g., stylus pen), and/or visual aid (e.g., HoloLens) such as by pressing and releasing a button of the mouse or touchpad, such as is sometimes referred to a "right-click" or "left-click", or the like) where it resides on the UI. Such an actuation may cause a list of objects which may be inserted at or near an edge of a top, bottom, or either side of the UI. The control object may be dragged to a location between items and released (e.g., by lifting a finger off the touch screen, or releasing a button in the case of a mouse or touchpad). Such a drag and drop action may cause a list of objects which may be inserted at the location of the control object. The control object may be dragged and released over an item on the UI. Such a drag and drop action may cause a list of possible modifications that may be applied to the item to be provided on the display. The modifications may be for the item over which the control object is located at a time the control object was released.

FIG. 1 illustrates, by way of example, a perspective view diagram of an embodiment of a UI 100 that includes an insertion/modification control object 140. The UI 100 as illustrated includes a plurality of items 120A, 120B, and 120C displayed thereon. A gap 130A and 130B may be displayed between directly adjacent items 120A-B and 120B-C, respectively. A dimension of the gap 130A is indicated by arrows 135. The UI 100 may be visible to a user through a display of a desktop computer, television, laptop/notebook computer, smart phone, tablet, or the like. The items 120A-C may include one or more of a text, an image, a video, an audio, a combination thereof, other item, or the like, each of which is discussed below.

A text item may include plain text, rich text, or the like. The text object may include a body of text and/or a header. Header text may include a larger font than body text. Header text may include a different font style than body text. A header generally separates sections of a document and indicates content of a section to follow. The body text may form a part of the section.

An image item may include an object encoded in an image format such as joint photographic experts group (JPEG), exchangeable image file format (Exif), tagged image file format (TIFF), graphics interchange format (GIF), bitmap (BMP), portable network graphics (PNG), portable pixmap (PPM), portable graymap (PGM), portable bitmap (PBM), portable any map (PNM), WebP, high dynamic range (HDR), high efficiency image file format (HEIF), better portable graphics (BPG), computer graphics metafile (CGM), Gerber, scalable vector graphics (SVG), a three dimensional image format, or the like. Many other image formats exist and such formats are not outside the scope of embodiments discussed herein. In an example, the image object may include a collection of image objects sequenced in time, sometimes referred to as a slideshow.

An audio item includes a pointer to or a graphical representation of an item that provides data that causes a speaker to produce sound, such as can include a voice, music, or other sound. Some typical encodings for audio data include free lossless audio coded (FLAC), moving picture experts group (MPEG) audio layer III (MP3), and Windows media audio (WMA). Many other audio encoding formats exist and such formats are not outside the scope of embodiments discussed herein.

A video item may include a combination of one or more audio objects synchronized with one or more image objects. A video object generally includes a series of images (e.g., frames) that may be played at a specified number of frames per minute or second. Some typical encodings for video items include MPEG, high efficiency video coding (HEVC), Theora, RealVideo, audio video interleave (AVI), MPEG-4 part 14 (MP4), flash video (FLV), or the like. Many other video encoding formats exist and such formats are not outside the scope of embodiments discussed herein.

In one or more embodiments, the UI 100 may increase the space between the items 120A-B (the gap 130A) a specified number of pixels in response to determining one or more central pixels of the control object 140 is within a specified number of pixels from the gap 130A or within the gap 130A. The specified number of pixels may be dependent on an overall number of pixels of the display on which the UI is presented. For example, the specified number of pixels may be greater for a larger display screen or a display generated at a higher resolution and less for a smaller display screen or a display generated at a lower resolution.

In one or more embodiments, if the control object 140 is displayed near an edge of an item on an end of a row or column of items on the UI 100 (e.g., the item 120C in the example of the UI 100 is at an end of a row of items) the UI 100 may cause the display to show a gap 130C (see FIG. 2) that would exist if an item is added below the item on the end of the row or column. FIG. 2 illustrates, by way of example, a perspective view diagram of an embodiment of a UI 200. The UI 200 includes the gap 130C in response to detecting the control object 140 is within the specified number of pixels from the item 120C.

Determining a location of the control object relative to items on the UI may include comparing a location associated with one or more central pixel(s) (e.g., a center pixel) of the control object 140 to an x-location and/or y-location of edges of items on the UI. In the example of the UI 100 and 200, only one dimension of the location of the control object 140 (the y-dimension in the case of FIGS. 1 and 2) may be sufficient to determine the location of the control object relative to one or more items 120A-C of the UI 100. For example, a y-dimension of the top edge and bottom edge of each of the items 120A-C may be compared to the location of the central pixel(s) of the control object 140. The comparison may determine whether the control object 140 is within a specified number of pixels from the edge of the item 120A-C. In the example of FIG. 2, the control object 140 is determined, by processing circuitry or other processing unit (see FIGS. 18 and/or 20), to be within a specified number of pixels of a bottom edge of the item 120C.

In the embodiment of FIG. 2, a user may have selected the control object 140, such as by having a finger that touches the control object 140 on a touch screen or holding a mouse button of a mouse while a cursor is over the control object 140. FIG. 3 illustrates, by way of example, a perspective view diagram of an embodiment of a UI 300. The UI 300 may be shown on the display in response to a user dragging the control object 140 (e.g., removing their finger from or releasing a mouse button) at or near the location of the control object 140 shown in FIG. 2.

The UI 300 includes a list of object types 350A, 350B, 350C, and 350D that may be inserted at a location above or below the gap 130C. The UI 300 includes object categories 360A, 360B, 360C, and 360D of a selected object type. In the embodiment of the UI 300 the object type 350A is the selected object type as indicated by the underline 380. The UI 300 as illustrated includes a location indicator object 370A that indicates the location at, above, or below which a selected object will be inserted. An inserted object becomes an item displayed on the UI. The object may be inserted adjacent (above, below, beside, or a combination thereof) one or more items on a UI.

The location indicator object 370A may appear at the end or beginning of the items displayed on the UI or at an end or beginning of a list of items in response to a user actuating (selecting and releasing) the control object 140 while the control object 140 is in a default position. An example default position for the control object 140 is provided in FIG. 1.

The object types 350A-D may include a video, an image, text, link, social media, multiple images, multiple videos, multiple text, multiple links, multiple posts, popular types, most recently used types, a combination thereof, or the like. For example, the object type 350A may indicate a popular object type or recently used object type, the object type 350B may indicate a text type object, the object type 350C may indicate an image type object, and the object type 350D may indicate a social media type object.

In an embodiment in which the object type 350A is a popular object type, the object categories 360A-D may include the categories selected most by a user over a specified period of time (e.g., an hour, day, week, month, year, lifetime, etc.). In an embodiment in which the object type 350A is a most recently used object type, the object categories 360A-D may include the categories most recently selected by a user, such as with the oldest category being removed when a new category is selected and/or an order of the categories being altered in response to a user selecting an object category already in the list. For example, the object category 360A may indicate a category most recently selected, the object category 360B may indicate the category selected immediately before the category 360A, the object category 360C may indicate the category selected immediately before the category 360B, and so on. If a user then selects the object category 360B, the object categories 360A-D may be illustrated with the object category 360B in place of the object category 360A and the object category 360A in place of the object category 360B in the locations they are shown in FIG. 3. The location of the object categories 360A-D relative to one another may thus represent a popularity or relative timeframe in which the object category was last selected. For example, an object category displayed further left, further right, closer to the top, and/or closer to the bottom on the UI 300 may indicate a greater or lesser popularity or a greater or lesser time since the object category was last selected.

In response to a user selecting an image type, the object categories 360A-D may include one or more of a link to one or more images stored on or otherwise available to a device, a link to one or more videos stored on or otherwise available to the device, or the like. In response to a user selecting a text type, the object categories 360A-D may include one or more of a general text category, a block text category, and/or a heading category. In response to a user selecting a social media type category, the categories 360A-D may include one or more links to social media accounts of a user signed in to the device. In response to a user selecting a link type, the object categories 360A-D may include one or more uniform resource locators (URLs) which may be provided as an item for a user to select and access the content of the URL. In response to a user selecting a multiple image type, the categories 360A-D may include layout options for multiple images, videos, text, URLs, social media items, or the like to be presented in an area typically occupied by a single item 120A-C. For example, a grid of two or more images, blocks of text, videos, social media items, or the like may be provided side-by-side in the space occupied by the item 120A-C, a slideshow which presents two or more images, blocks of text, videos, social media items, or the like in a sequential order, such as with or without the user interacting with the items (e.g., a specified amount of time elapsing before a next item in the slideshow is presented or a user selecting item of the slideshow to cause a next item in the slideshow to be presented in the space for viewing the item 120A-C).

The control object 140 or an indicia thereon may disappear from view in response to a user releasing the control object 140. In the example of FIG. 3, the "+" indicia on the control object 140 is no longer displayed in response to the user releasing the control object 140. The location indicator object 370A may persist (be omni-present) at least until a user selects an item to be inserted at or near a location indicated by the location indicator object 370A. The control object 140 may be presented at a default location in response to the user selecting an item to be inserted. The control object 140 may persist in the default location through a user scrolling, for example. The control object 140 may "float" over other items on the UI, such as to be shown at a layer on top of the layer on which other items on the UI are displayed. In one or more embodiments, the control object 140 may be shown at all times, be omni-present and floating.

FIG. 4 illustrates, by way of example, a perspective view diagram of an embodiment of a UI 400. The UI 400) as illustrated includes a view after the control object 140 has been moved to a location between two items 120B-C, such as over the gap 130B. A location indicator object 370B is provided to indicate to a user a location at which an item may be inserted. In response to the user releasing the control object 140, a menu of items that may be inserted at the location indicated by the location indicator object 370B and/or the control object 140 may disappear or be altered to indicate that the function of the control object 140 has changed. The menu of items may include the object types 350A-D (as discussed with regard to FIG. 3) and object categories 360E-J for a default object type or an object type selected by the user. The gap 130C and/or the location indicator object 370A may disappear, in response to a user moving the control object 140 more than the specified number of pixels away from the gap 130C, such as without releasing the control object 140 within the gap 130C (e.g., within the gap and/or within a specified number of pixels from the gap 130C).

FIG. 5 illustrates, by way of example, a perspective view diagram of an embodiment of a UI 500. The UI 500 as illustrated includes a view after the control object 140 has been moved to a location above a top most item on the UI 400, such as above the item 120A. A location indicator object 370C is provided to indicate to a user a location at which an item may be inserted if the user releases the control object 140 while the location indicator object 370C is shown. In response to the user releasing the control object 140, a menu of items that may be inserted at the location indicated by the location indicator object 370B and/or the control object 140 may disappear or be altered to indicate that the function of the control object 140 has changed. The menu of items may include the object types 350A-D (as discussed with regard to FIG. 3) and object categories 360L-N for a default object type or an object type selected by the user.

FIG. 6 illustrates, by way of example, a perspective view diagram of an embodiment of a UI 600. The UI 600 includes a view of the control object 140 after it was released while the location indicator object 370C was being shown and moved to the object menu. The control object 140 is altered (the "+" indicia has been removed) to indicate that the function of the control object 140 has changed. The control object 140 may act as a selection tool, similar to a cursor, after it has been released on a UI.

The control object 140 may be used for scrolling on the UI. The UI may update what is displayed in response to the control object 140 being situated within a threshold number of pixels from an edge of the UI.

FIG. 7 illustrates, by way of example, a perspective view diagram of an embodiment of a UI 700. The UI 700 includes a view of the control object 140 as a user is performing a swiping motion while the control object 140 is selected. Arrow 710 indicates a direction of the swipe. Note that the object type 350B is selected in FIG. 7. The swiping motion may be performed in an area of the UI 700 that comes into view after the user selects and releases the control object 140. In the embodiments discussed thus far, this region is within dashed box 720. The swiping motion indicated in FIG. 7 may have no effect when performed outside the dashed box 720. When performed within the dashed box 720, the swiping motion (e.g., swiping left in this instance) may cause the selected object type to be changed to the object type (if any) immediately to the right of the currently selected object type 350B. The object type to the right of the object type in the example of FIG. 7 is the object type 350C. FIG. 8 illustrates, by way of example, a perspective view diagram of an embodiment of a UI 800. The UI 800 is a view after the swipe motion discussed with regard to FIG. 7 is completed. The object type 350C is underlined in FIG. 8 indicating that it is now the selected object type.

FIG. 9 illustrates, by way of example, a perspective view diagram of an embodiment of a UI 900. The UI 900 includes a view of the control object 140 as a user is performing a swiping motion while the control object 140 is selected. Arrow 910 indicates a direction of the swipe. Note that the object type 350B is selected in FIG. 9. The swiping motion may be performed in an area of the UI 700 that comes into view after the user selects and releases the control object 140. In the embodiments discussed thus far, this region is within dashed box 720. The swiping motion indicated in FIG. 7 may have no effect when performed outside the dashed box 720. When performed within the dashed box 720, the swiping motion (e.g., swiping right in this instance) may cause the selected object type to be changed to object type (if any) immediately to the left of the currently selected object type 350B. The object type to the left of the object type in the example of FIG. 9 is the object type 350A. FIG. 10 illustrates, by way of example, a perspective view diagram of an embodiment of a UI 1000. The UI 1000 is a view after the swipe motion discussed with regard to FIG. 9 is completed. The object type 350A is underlined in FIG. 10 indicating that it is now the selected object type.

FIG. 11 illustrates, by way of example, a perspective view diagram of an embodiment of a UI 1100. The UI 1100 includes a view after an object has been selected from the object menu and inserted as an item 120D that is visible on the UI 1100. The item 120D is inserted in the location indicated by the location indicator object 370C of FIGS. 5-10. The view of each of the items 120A-C below the item 120D is shifted lower on the UI 1100 to accommodate the item 120D (e.g., a location of each of the items 120A-C is adjusted by a size of the item 120D and a corresponding gap 130D between the item 120D and the item 120A. The control object 140 is returned to being in view in its default position, in response to the user selecting the object that becomes the visible item 120D.

FIG. 12 illustrates, by way of example, a perspective view diagram of an embodiment of a UI 1200. The UI 1200 is similar to the UI 1100, with the UI 1200 including the item 120D inserted between the item 120B and the item 120C (e.g., at a location indicated by the location indicator object 370B in FIG. 4). The items 120A-B remain in the same position and the item 120C moves lower on the UI 1200 to accommodate the item 120D.

FIG. 13 illustrates, by way of example, a perspective view diagram of an embodiment of a UI 1300. The UI 1300 is similar to the UI 1300, with the UI 1300 including the item 120D inserted after the item 120C (e.g., in a location by the location indicator object 370A). None of the items 120A-C have changed position, but the gap 130C and the item 120D are added to the UI 1300.

FIG. 14 illustrates, by way of example, a perspective view diagram of an embodiment of a UI 1400. The UI 1400 includes a view of a cancellation zone object 1450. The cancellation zone object 1450 may appear in the default location of the control object 140. The cancellation zone object 1450 may appear in response to the control object 140 being selected and dragged away from the default location of the control object 140. A user may cancel an insert and/or modification operation by dragging (while the control object 140 is selected) the control object 140 to the cancellation zone object 1450. The control object 140 may be shown in the default location in response to a user releasing the control object 140 while at least a portion of the control object 140 is within a perimeter (or within a threshold number of pixels of the perimeter) of the cancellation zone object 1450 or one or more central pixels of the control object 140 are within the perimeter (or within a threshold number of pixels of the perimeter) of the cancellation zone object 1450. In one or more embodiments, an insert (or modification) operation may be cancelled in response to a user releasing the control object 140 in an area a threshold number of pixels away from an item on the UI. For example, if a user releases the control object 140 below the gap 130C in FIG. 2, the modification or insert operation may be cancelled and the control object 140 may be returned to a default position.

The control object 140, in one or more embodiments, may be used by a user to select an object to be modified. The object may be selected by a user releasing the control object 140 while the control object 140 is displayed on the item 120A-D. In the example of FIG. 14, a modification menu (similar to the object menu, but with modification options instead of options of objects to insert) may appear, such as in the area indicated by the dashed box 720, the indicated modification options for the item 120B (if a user releases the control object 140 at the location illustrated in FIG. 14). The modifications may include, text editing options, filters to add to photographs or videos, font size, font, change chart type (e.g., pie, bar, or the like), change table to chart, change text style or treatment, change group type, change grid of image representation, change text and image relationship (e.g., text under image, over image, on image, on sides of the image, etc.), other modifications, or the like.

In one or more embodiments, the view of the item 120B on the UI may be modified (include pixel values associated with a rendered version of the item 120B altered, such as to indicate highlighting, outlining, or the like) to indicate that the user may modify the item by releasing the control object 140 in its present location. The modification options may be different for different object types and/or categories.

FIG. 15 illustrates, by way of example, a perspective view diagram of an embodiment of a UI 1500. The UI 1500 includes a view of the item 120B with pixel values modified to indicate that the item 120B may be modified in response to a user releasing the control object 140.

FIG. 16 illustrates, by way of example, a perspective view diagram of an embodiment of a UI 1600. The UI 1600 includes a plurality of items 120E, 120F, 120G, and 120H and corresponding gaps between items 130F, 130G, 130H, 130I, and 130J. The UI 1600 is a view of the UI 1300 after the items 120E-H have been added and a user has scrolled down (e.g., by swiping up or down or activating a mouse button and moving the mouse while the button is activated, moving a scroll button on a mouse, selecting a scroll object, trackpad, keyboard, touchpad input on the UI 1600, or the like). As the user scrolls on a UI, the control object 140 may remain in the default position on the display over items scrolled underneath the control object 140, even as the items move on the UI. The control object 140 may thus remain in view over one or more of the items 120A-H and/or gaps 130C and 130F-J.

Each of the embodiments illustrated thus far regard items in a list, where items are stacked on top of one another and no items are situated side-by-side on the display (even though one item may consist of multiple images side-by-side, the item may be logically treated as a single item in a memory). In these embodiments, in determining a position the control object 140 relative to the item(s) on the UI, it may be sufficient to only keep track of a y-position of the items and the control object on the display. However, there are some embodiments in which items may be situated just side-by-side, rather than just strictly above or below each other. In such embodiments, in determining a position the control object 140 relative to the item(s) on the UI, it may be sufficient to only keep track of an x-position of the items and the control object on the display. Also, there are many embodiments in which items may be situated side-by-side and above and below each other on the UI. In such embodiments, in determining a position the control object 140 relative to the item(s) on the UI, the x-position and y-position of the items and the control object on the display may be tracked.

Figure 17:
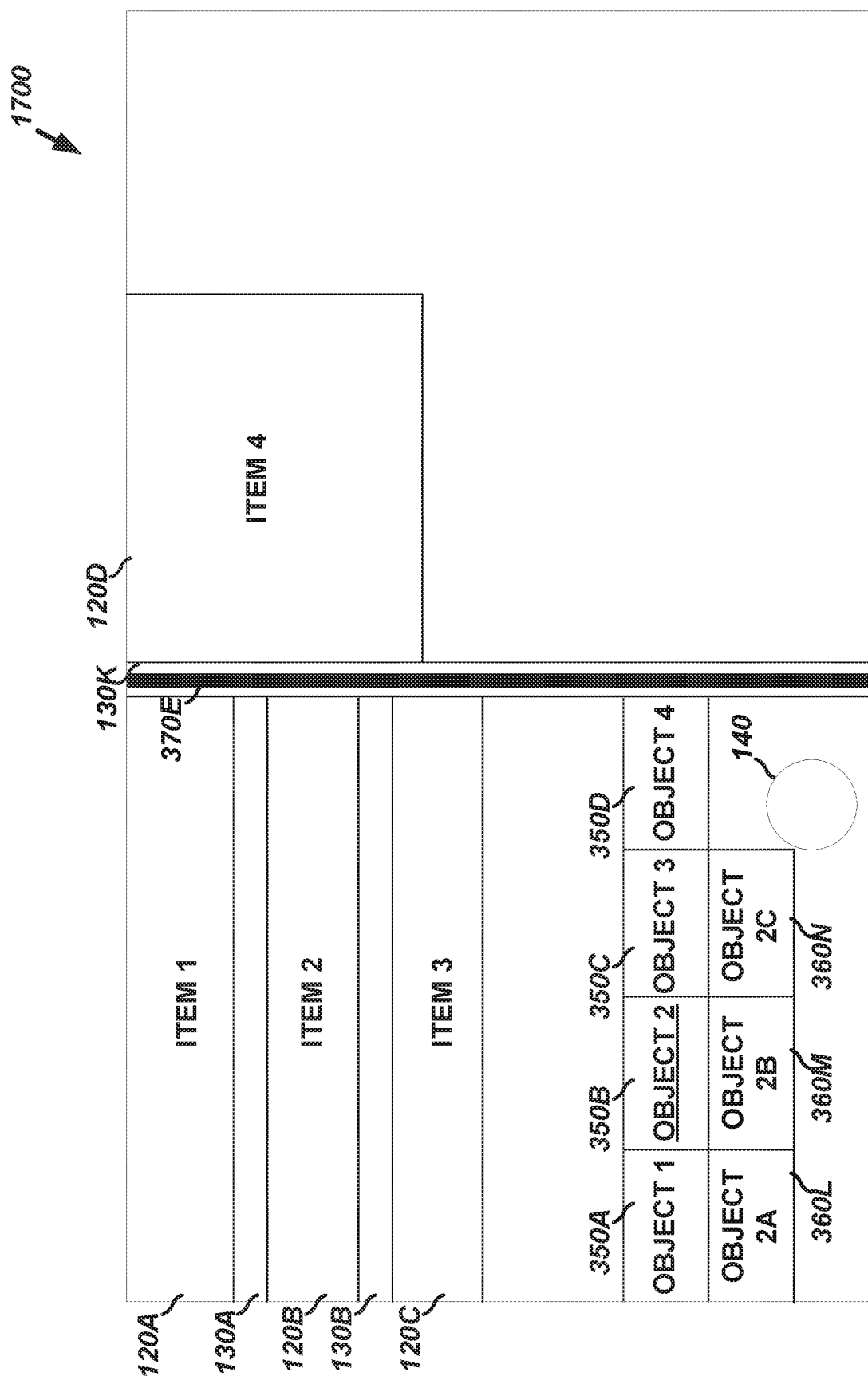
FIG. 17 illustrates, by way of example, a perspective view diagram of an embodiment of another UI.

FIG. 17 illustrates, by way of example, a perspective view diagram of an embodiment of a UI 1700. The UI 1700 includes items 120A-C situated above and/or below one another and the item 120D situated side-by-side with the items 120A-C. The UI 1700 includes a location indicator object 370E in a gap 130K between the items 120A-C and the item 120D. The location indicator object 370E appears between the items 120A-C and the item 120D in response to the control object 140 being released at or near the gap 130K. An object selected while the location indicator object 370E is in view will appear between the items 120A-C and the item 120D.

Figure 18:
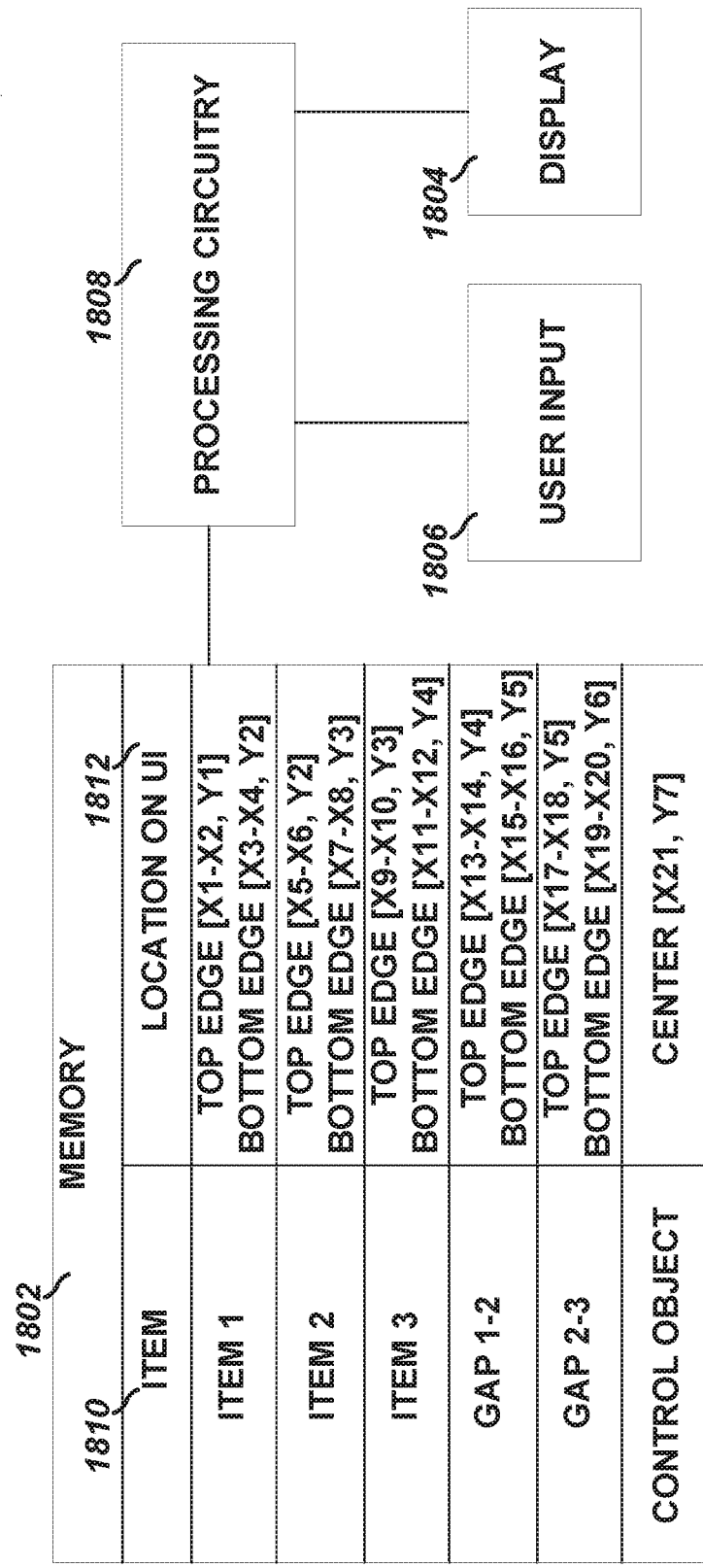
FIG. 18 illustrates, by way of example, a logical block diagram of an embodiment of a system.

FIG. 18 illustrates, by way of example, a logical block diagram of an embodiment of a system 1800. The system 1800 may provide a user with access to a control object 140, such as for insertion or modification of an item on a user interface viewed on a display 1804. The system 1800 as illustrated includes a memory 1802, the display 1804, user input device 1806, and processing circuitry 1808.

The memory 1802 may include data including each of the items 1810 shown on a UI and a location 1812 of each of the items 1810 on the UI. The items 1810 may include the items 120, gaps 130, and the control object 140. The location 1812 may form a location map of the items on the UI. The location 1812 illustrated in FIG. 18 assumes that each of the item 1810 with the exception of the control object 140 are rectangular or other four-sided polygon. The location 1812 includes enough data for the processing circuitry 1808 to infer or otherwise determine a full extent of the pixels occupied by each of the items 1810 (except for the control object 140).

The display 1804 may include an LED, LCD, touch screen, or other display with which a user may interact, such as directly or using the user input device 1806. The user input device 1806, is optional, and may include a keyboard, mouse, or other device that a user may use to navigate and/or provide input to a UI. The user input device 1806 is not necessary in an embodiment in which the display 1804 is a touch screen.

The processing circuitry 1808 may include a processing device (e.g., a CPU. GPU, FPGA, ASIC, or the like) or electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, logic gates, or the like) configured to perform operations of the processing circuitry 1808. The processing circuitry 1808 receives data from the display 1804 and/or user input device 1806 and updates the items 1810 and/or the location 1812 in response to the received data. For example, the processing circuitry 1808 may perform one or more of the following operations: (1) comparing a location of the control object to the location of other items (as indicated in the memory 1802) and causing the display to show a location indicator in a gap in response to determining the control object 140 is in or within a threshold number of pixels from the gap; (2) comparing a location of the control object to the location of other items (as indicated in the memory 1802) causing the display to show an item highlighted or otherwise modified in response to determining the control object is over or within a threshold number of pixels of an item on the display; (3) causing the display 1804 to show a cancellation zone object in response to determining the control object has been moved from a default location; (4) receiving input from the user input device 1806 and updating the location of the items 1810 and/or the control object 140 based on the received input; (5) receiving input from the display 1804 and updating the location of the items 1810 and/or the control object 140 based on the received input; (6) receiving input from the user input device 1806 or display 1804 and causing the display 1804 to show another item in a location indicated by a location indicator object; and (7) comparing a location of the control object to the location of other items (as indicated in the memory 1802) and causing the display to show a gap and/or location indicator in the gap in response to determining the control object 140 is in or within a threshold number of pixels from an item lowest, highest, or nearest a side edge on the UI.

Figure 19:
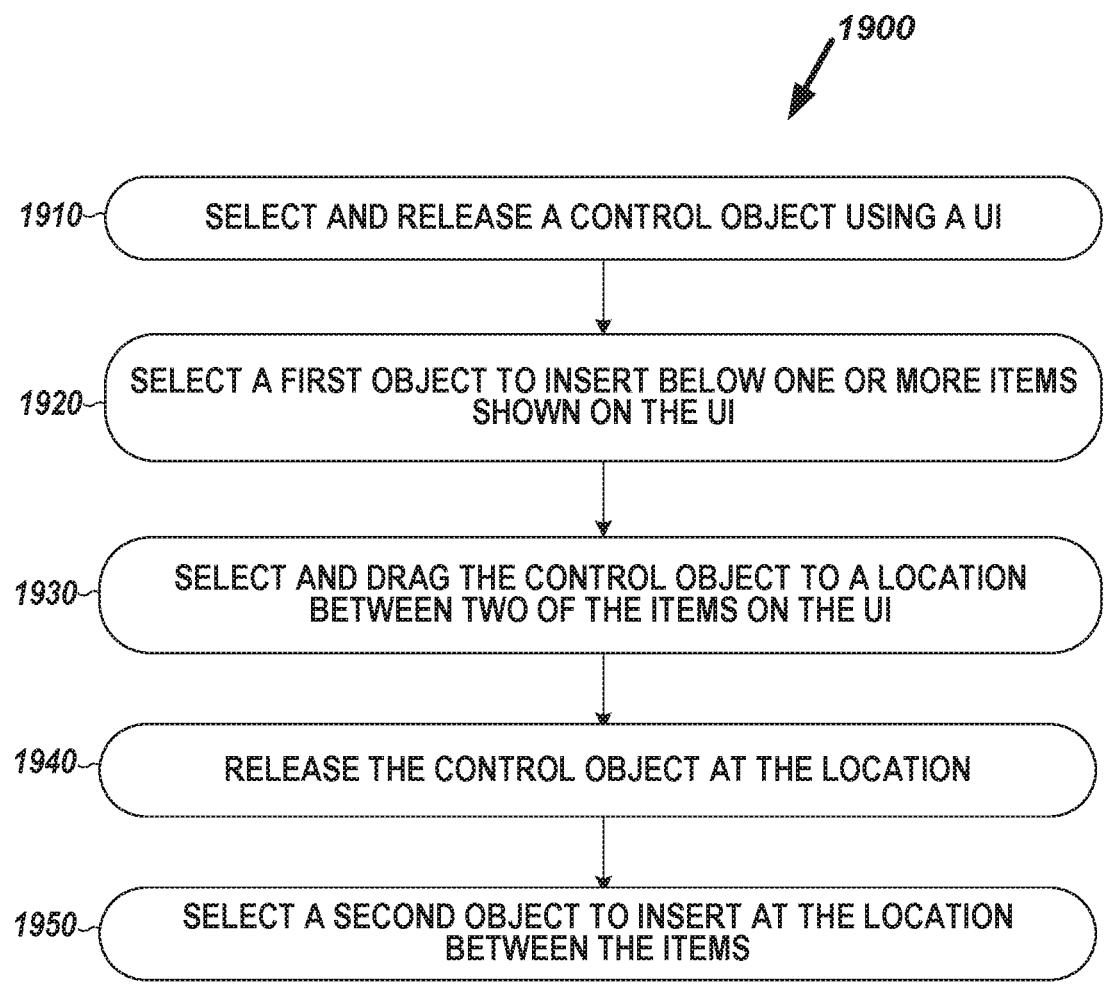
FIG. 19 illustrates, by way of example, a flow diagram of an embodiment of a method.

FIG. 19 illustrates, by way of example, a flow diagram of an embodiment of a method 1900). The method 1900 as illustrated includes selecting and releasing a control object using a UI, at operation 1910; selecting a first object to insert below two or more items shown on the UI, at operation 1920; selecting and dragging the control object to a location between two of the items on the UI, at operation 1930; releasing the control object at the location, at operation 1940; and selecting a second object to insert at the location between the items, at operation 1950. Any of the operations of the method 1900 may be performed by a user using a user input device. The first object may be one of a first set of objects shown on the UI in response to releasing the control object. The second object is one of the first set of objects shown on the UI in response to releasing the control object.

The method 1900 may further include swiping left or right on the UI while the first set of objects is shown, wherein a second set of objects appears in place of the first set of objects in response to the swiping. The method 1900 may further include after selecting and dragging the control object away from a default location, dragging the control object to within a threshold number of pixels of a cancellation zone object on the UI to cause an insert operation to be cancelled. The method 1900 may further include after (e.g., in response to) selecting and dragging the control object away from a default location, dragging the control object to a location more than a threshold number of pixels away from all items shown on the UI to cause an insert operation to be cancelled.

The method 1900 may further include selecting and dragging the control object over a third item on the UI, releasing the control object while it is over the third item, and selecting a modification option to apply to the third item, the modification option shown on the UI in response to releasing the control object over the third item. The third item may include an image and wherein the modification option includes a filter to applied to the image. The first set of objects include items most recently selected by a user and items selected a most number of times by the user.

Figure 20:
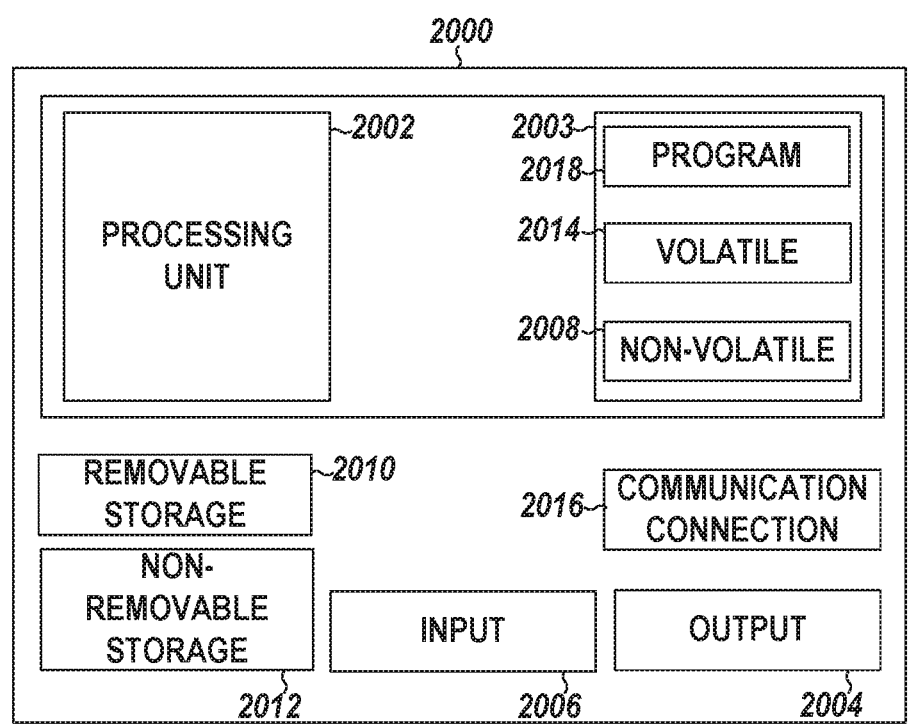
FIG. 20 is a block schematic diagram of a machine (e.g., a computer system) to implement a UI according to example embodiments.

FIG. 20 is a block schematic diagram of a machine 2000 (e.g., a computer system) to implement one or more UIs discussed herein, according to example embodiments. One example machine 2000 (in the form of a computer), may include a processing unit 2002, memory 2003, removable storage 2010, and non-removable storage 2012. Although the example computing device is illustrated and described as machine 2000, the computing device may be in different forms in different embodiments. For example, the computing device may instead be a smartphone, a tablet, smartwatch, or other computing device including the same or similar elements as illustrated and described with regard to FIG. 20. Devices such as smartphones, tablets, and smartwatches are generally collectively referred to as mobile devices. Further, although the various data storage elements are illustrated as part of the machine 2000, the storage may also or alternatively include cloud-based storage accessible via a network, such as the Internet.

Memory 2003 may include volatile memory 2014 and non-volatile memory 2008. The machine 2000 may include—or have access to a computing environment that includes—a variety of computer-readable media, such as volatile memory 2014 and non-volatile memory 2008, removable storage 2010 and non-removable storage 2012. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 2000 may include or have access to a computing environment that includes input 2006, output 2004, and a communication connection 2016. Output 2004 may include a display device, such as a touchscreen, that also may serve as an input device. The input 2006 may include one or more of a touchscreen, touchpad, mouse, keyboard, camera, one or more device-specific buttons, one or more sensors integrated within or coupled via wired or wireless data connections to the machine 2000, and other input devices. The computer may operate in a networked environment using a communication connection to connect to one or more remote computers, such as database servers, including cloud based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 2002 of the machine 2000. A hard drive. CD-ROM, and RAM are some examples of articles including a non-transitory computer-readable medium such as a storage device. For example, a computer program 2018 may be used to cause processing unit 2002 to perform one or more methods or algorithms described herein.

Additional Notes And Examples

Example 1 includes a method for using a user interface (UI) of a computing device, the method comprising selecting, using a user input device and releasing a control object using the UI, selecting a first object to insert below one or more items shown on the UI, wherein the first object is one of a first set of objects shown on the UI in response to releasing the control object, selecting and dragging the control object to a location between two of the items on the UI, releasing the control object at the location, and selecting a second object to insert at the location between the items, wherein the second object is one of the first set of objects shown on the UI in response to releasing the control object.

In Example 2, Example 1 may further include swiping left or right on the UI while the first set of objects is shown, wherein a second set of objects appears in place of the first set of objects in response to the swiping.

In Example 3, at least one of Examples 1-2 may further include after selecting and dragging the control object away from a default location, dragging the control object to within a threshold number of pixels of a cancellation zone object on the UI to cause an insert operation to be cancelled.

In Example 4, at least one of Examples 1-3 may further include after selecting and dragging the control object away from a default location, dragging the control object to a location more than a threshold number of pixels away from all items shown on the UI to cause an insert operation to be cancelled.

In Example 5, at least one of Examples 1-4 may further include selecting and dragging the control object over a third item on the UI, releasing the control object while it is over the third item, and selecting a modification option to apply to the third item, the modification option shown on the UI in response to releasing the control object over the third item.

In Example 6, Example 5 may further include, wherein the third item includes an image and wherein the modification option includes a filter to applied to the image.

In Example 7, at least one of Examples 1-6 may further include, wherein the first set of objects include items most recently selected by a user and items selected a most number of times by the user.

Example 8 includes a system comprising a display device, processing circuitry, a memory including instructions that, when executed by the processing circuitry, cause the processing circuitry to perform operations comprising, providing signals that cause the display device to show a control object on the display device, in response to receiving one or more signals, from a user input device, determining that a user has dragged the control object to within a threshold number of pixels of a gap between items shown on the display device and provide signals that cause the display device to show a location indicator at the gap, the location indicator indicating a location at which an item will be inserted if the user releases the control object at the location, in response to receiving one or more signals indicating that the user has released the control object at the location, providing signals that cause the display device to show a list of objects for insertion at the location indicated by the location indicator, and in response to receiving one or more signals indicating that the user has selected an object from the list of objects, providing signals that cause the display device to show the selected object as an item at the location indicated by the location indicator.

In Example 9, Example 8 may further include, wherein the display device is a touch screen and the user input device is the touch screen.

In Example 10, at least one of Examples 8-9 may further include, wherein the system further comprises the user input device coupled to the display device and wherein the user input device includes at least one of a mouse and a keyboard.

In Example 11, at least one of Examples 8-10 may further include, wherein the memory further includes data defining a location and extent of items and gaps between the items shown on the display device and a location of one or more central pixels of the control object stored thereon, and wherein determining that the user has dragged the control object to within a threshold number of pixels of a gap between items shown on the display device includes comparing the location of the one or more central pixels to the location and extent of items and gaps between the items.

In Example 12, at least one of Examples 8-11 may further include, wherein the operations further include providing signals that cause the display device to show the control object at a default location on the display device until receiving signals from the user input device indicating that the user has selected and dragged or selected and released the control object.

In Example 13, at least one of Examples 8-12 may further include, wherein the operations further include in response to receiving signals from the user input device indicating that the user has selected and dragged the control object away from a default location of the control object, providing the signals that cause the display device to show a cancellation zone object in the default location of the control object.

In Example 14, Example 13 may further include, wherein the operations further include in response to determining, based on location data in the memory, the user has dragged the control object to the cancellation zone object and released, based on signals from the user input device, the control object while one or more central pixels of the control object are within a threshold number of pixels from the cancellation zone object, providing signals that cause the display device to show the control object at the default location.

Example 15 includes at least one non-transitory machine-readable medium, including instructions that, when executed by a machine, cause the machine to perform operations comprising in response to receiving, from a user input device, data indicating that an insert control object was dragged on a display device, determining whether the insert control object was dragged to a location between two items of one or more items on the display device, to a location above the one or more items on the display device, or to a location below the one or more items on the display device, providing signals to the display device that cause the display device to show a location indicator object that indicates a location at which an item, when inserted using the insert control object, will be displayed, in response to receiving data indicating that the insert control object was released, providing signals that cause the display device to show a list of objects for insertion at the location indicated by the location indicator object, and in response to receiving a selection of an object of the objects, providing signals that cause the display device to show the selected object at the location indicated by the location indicator object.

In Example 16, Example 15 may further include, wherein the at least one non-transitory machine-readable medium further includes data defining a location and extent of the one or more items shown on the display device and a location of one or more central pixels of the insert control object stored thereon, and wherein determining that the insert control object has been dragged to the location between the two items shown on the display device includes comparing the location of the one or more central pixels to the location and extent of items.

In Example 17, at least one of Examples 15-16 may further include, wherein the operations further include providing signals that cause the display device to show the insert control object at a default location on the display device until receiving signals from the user input device indicating that the insert control object has been selected and dragged or selected and released the insert control object.

In Example 18, at least one of Examples 15-17 may further include, wherein the operations further include, in response to receiving signals from the user input device indicating that the insert control object has been selected and dragged the away from a default location of the insert control object, providing the signals that cause the display device to show a cancellation zone object in the default location of the insert control object.

In Example 19, at least one of Examples 15-18 may further include, in response to determining, based on location data in the at least one non-transitory machine-readable medium, the insert control object has been dragged to the cancellation zone object and released, based on signals from the user input device, the insert control object while one or more central pixels of the insert control object are within a threshold number of pixels from the cancellation zone object, providing signals that cause the display device to show the insert control object at the default location.

In Example 20, at least one of Examples 15-19 may further include, in response to determining, based on location data in the at least one non-transitory machine-readable medium, the insert control object has been dragged away from a default location and to a location more than a threshold number of pixels away from all the one or more items on the UI, causing an insert operation to be cancelled.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method for using a user interface (UI) of a computing device, the method comprising:
    selecting and dragging, using a user input device, a control object to a location between two items among a plurality of items shown on the UI;
    releasing the control object at the location;
    in response to releasing the control object at the location, displaying, in a region of the UI, a list of types of objects to be inserted while the items remain displayed on the UI;
    selecting and dragging the control object to a first type of object of the list of types of objects;
    releasing the control object at the first type of object, wherein in response to releasing the control object, the UI displays a first set of objects of the selected first type of object with the list of types of objects in the region of the UI;
    swiping in the region of the UI that includes the list of types of objects and the first set of objects;
    in response to the swiping, displaying, while the items and the list of types of objects remain displayed on the UI and in place of the first set of objects, a second set of objects of a second type of object of the list of types of objects that is directly next to the first type object in a direction corresponding to the swiping; and
    selecting a second object of the second set of objects via the control object, while the items remain displayed on the UI, to insert at the location between the two items.

2. The method of claim 1, further comprising:
    after selecting and dragging the control object away from a default location, dragging the control object to within a threshold number of pixels of a cancellation zone object on the UI to cause an insert operation to be cancelled.

3. The method of claim 1, further comprising:
    after selecting and dragging the control object away from a default location, dragging the control object to a location more than a threshold number of pixels away from all items shown on the UI to cause an insert operation to be cancelled.

4. The method of claim 1, further comprising:
    selecting and dragging the control object over a third item on the UI;
    releasing the control object while it is over the third item; and
    selecting a modification option to apply to the third item, the modification option shown on the UI in response to releasing the control object over the third item.

5. The method of claim 4, wherein the third item includes an image and wherein the modification option includes a filter to be applied to the image, change chart type, change table to chart, change text style, or change group type, change text relative to image.

6. The method of claim 1, wherein the first set of objects include items most recently selected by a user and items selected a most number of times by the user.

7. A system comprising:
    a display device;
    processing circuitry;
    a memory including instructions that, when executed by the processing circuitry, cause the processing circuitry to perform operations comprising:
    providing signals that cause the display device to show a control object on the display device;
        in response to receiving one or more signals, from a user input device, determining that a user has dragged the control object to within a threshold number of pixels of a gap between items shown on the display device and providing signals that cause the display device to show a location indicator at the gap, the location indicator indicating a location at which an object will be inserted if the user releases the control object at the location and then selects the object;
        in response to receiving one or more signals indicating that the user has released the control object at the location, providing signals that cause the display device to show, in a region of the display device and while the items remain displayed on the display device, a list of types of objects for insertion at the location indicated by the location indicator;
        in response to receiving one or more signals indicating the user has selected and dragged the control object to a type of object of the list of types of objects and released the control object at the type of object, providing signals that cause the display device to show, in the region and of the display device and while the items remain displayed on the display device, a first set of objects on the display device of the selected type with the list of types of objects;
        in response to receiving one or more signals indicating the user has swiped in a region of the display device include the first set of objects and the list of types of objects, providing signals that cause the display device to show, while the items and the list of types of objects remain displayed on the display device and in place of the first set of objects, a second set of objects of a second type of object of the list of types of objects that is directly next to the first type object in a direction corresponding to the swiping; and in response to receiving one or more signals indicating that the user has selected an object of the second set of objects via the control object, providing signals that cause the display device to show, while the items remain displayed on the display device, the selected object as an item along with the items at the location indicated by the location indicator.

8. The system of claim 7, wherein the display device is a touch screen and the user input device is the touch screen.

9. The system of claim 7, wherein the system further comprises the user input device coupled to the display device and wherein the user input device includes at least one of a mouse, keyboard, pen, and visual aid.

10. The system of claim 7, wherein the memory further includes data defining a location and extent of items and gaps between the items shown on the display device and a location of one or more central pixels of the control object stored thereon, and wherein determining that the user has dragged the control object to within a threshold number of pixels of a gap between items shown on the display device includes comparing the location of the one or more central pixels to the location and extent of items and gaps between the items.

11. The system of claim 7, wherein the operations further include:
providing signals that cause the display device to show the control object at a default location on the display device until receiving signals from the user input device indicating that the user has selected and dragged or selected and released the control object.

12. The system of claim 7, wherein the operations further include:
in response to receiving signals from the user input device indicating that the user has selected and dragged the control object away from a default location of the control object, providing the signals that cause the display device to show a cancellation zone object in the default location of the control object.

13. The system of claim 12, wherein the operations further include:
in response to determining, based on location data in the memory, the user has dragged the control object to the cancellation zone object and released, based on signals from the user input device, the control object while one or more central pixels of the control object are within a threshold number of pixels from the cancellation zone object, providing signals that cause the display device to show the control object at the default location.

14. At least one non-transitory machine-readable medium, including instructions that, when executed by a machine, cause the machine to perform operations comprising:
in response to receiving, from a user input device, data indicating that an insert control object was dragged on a display device, determining whether the insert control object was dragged to a location between two items on the display device, to a location above the two items on the display device, or to a location below the two items on the display device;
providing signals to the display device that cause the display device to show a location indicator object that indicates a location at which an item, when inserted using the insert control object, will be displayed;
in response to receiving data indicating that the insert control object was released, providing signals that cause the display device to show, while the items remain displayed in a region on the display device, a list of types of objects for insertion at the location indicated by the location indicator object;
in response to receiving one or more signals indicating the user has selected and dragged the control object to a type of object of the list of types of objects and released the control object at the type of object, providing signals that cause the display device to show, in the region and while the items remain displayed on the display device, a first set of objects on the display device of the selected type with the list of types of objects;
in response to receiving one or more signals indicating the user has swiped in a region of the display device include the first set of objects and the list of types of objects, providing signals that cause the display device to show, while the items and the list of types of objects remain displayed on the display device and in place of the first set of objects, a second set of objects of a second type of object of the list of types of objects that is directly next to the first type of object in a direction corresponding to the swiping; and
in response to receiving a selection of an object of the second set of objects via the insert control object, providing signals that cause the display device to show, while the items remain displayed on the display device, the selected object at the location indicated by the location indicator object.

15. The at least one non-transitory machine-readable medium of claim 14, wherein the at least one non-transitory machine-readable medium further includes data defining a location and extent of the two items shown on the display device and a location of one or more central pixels of the insert control object stored thereon, and wherein determining that the insert control object has been dragged to the location between the two items shown on the display device includes comparing the location of the one or more central pixels to the location and extent of items.

16. The at least one non-transitory machine-readable medium of claim 14, wherein the operations further include:
providing signals that cause the display device to show the insert control object at a default location on the display device until receiving signals from the user input device indicating that the insert control object has been selected and dragged or selected and released the insert control object.

17. The at least one non-transitory machine-readable medium of claim 14, wherein the operations further include:
in response to receiving signals from the user input device indicating that the insert control object has been selected and dragged away from a default location of the insert control object, providing the signals that cause the display device to show a cancellation zone object in the default location of the insert control object.

18. The at least one non-transitory machine-readable medium of claim 17, wherein the operations further include:
in response to determining, based on location data in the at least one non-transitory machine-readable medium, the insert control object has been dragged to the cancellation zone object and released, based on signals from the user input device, the insert control object while one or more central pixels of the insert control object are within a threshold number of pixels from the cancellation zone object, providing signals that cause the display device to show the insert control object at the default location.

19. The at least one non-transitory machine-readable medium of claim 14, wherein the operations further include:
in response to determining, based on location data in the at least one non-transitory machine-readable medium, the insert control object has been dragged away from a default location and to a location more than a threshold number of pixels away from all the two items on the display device, causing an insert operation to be cancelled.

\* \* \* \* \*

UNITED STATES PATENT AND TRADEMARK OFFICE
CERTIFICATE OF CORRECTION

PATENT NO. : 10,599,319 B2  
APPLICATION NO. : 15/457757  
DATED : March 24, 2020  
INVENTOR(S) : Jung et al.

Page 1 of 1

It is certified that error appears in the above-identified patent and that said Letters Patent is hereby corrected as shown below:

On the Title Page

In item (54), and in the Specification, in "Title", in Column 1, Line 2, after "OBJECT", insert --FOR INSERTING OBJECT FROM SWIPABLE LIST--

Signed and Sealed this  
Second Day of June, 2020

Andrei Iancu  
*Director of the United States Patent and Trademark Office*